United States Patent [19]
Sendzimir et al.

[11] Patent Number: 5,537,878
[45] Date of Patent: Jul. 23, 1996

[54] STRIP FLATNESS MEASURING DEVICE

[75] Inventors: Michael G. Sendzimir, Woodbury; John W. Turley, Oxford; Zbigniew Rocki, Meriden, all of Conn.

[73] Assignee: T. Sendzimir, Inc., Waterbury, Conn.

[21] Appl. No.: 333,625

[22] Filed: Nov. 3, 1994

[51] Int. Cl.⁶ ........................................................ G01L 5/00
[52] U.S. Cl. ..................... 73/862.391; 73/862.55
[58] Field of Search ................ 73/862.391, 862.474, 73/862.541, 862.55, 105

[56] References Cited

U.S. PATENT DOCUMENTS

| | | |
|---|---|---|
| 3,413,846 | 12/1968 | Flinth . |
| 3,499,306 | 3/1970 | Pearson . |
| 3,557,614 | 1/1971 | Mulhberg . |
| 3,902,363 | 9/1975 | Ishimoto ............................... 73/862.07 |
| 4,024,755 | 5/1977 | Quehen ...................................... 73/105 |
| 5,275,062 | 1/1994 | Turley ................................ 73/862.391 |

FOREIGN PATENT DOCUMENTS 1160112  7/1966  United Kingdom .

Primary Examiner—Richard Chilcot
Assistant Examiner—Ronald Biegel
Attorney, Agent, or Firm—Frost & Jacobs

[57] ABSTRACT

An improved shapemeter is provided to measure the flatness of metal strip under tension as the strip passes over a shapemeter roll, the shapemeter including a stationary shaft with a set of bearings that allow the strip to easily pass over the shapemeter roll. The stationary shaft does not touch the inner ring of each bearing, but the inner ring is urged against a block having horizontal and vertical flexural members that deflect giving only a single degree of freedom. This single degree of freedom allows each block to rotate about a pivot point, which is defined by the locations of the flexural members, in the transverse vertical plane only. The shaft has a slot, which provides an open area in which a single box that contains all the force transducers is mounted. Each force transducer (e.g., a load cell) is attached to a thrust button that contacts the corresponding block, and thereby absorbs some of the vertical load on the block. The horizontal component of the force on the block is entirely supported by the pivot flexural members. The vertical component of this force is partly supported by the pivot flexural members and partly by the corresponding force transducer (through the thrust button). In this manner, the range of force being detected by each force transducer is reduced, thereby allowing for greater low-end sensitivity and accuracy, and the variation in force sensed by the force transducer is minimized if the wrap angle of the strip varies.

18 Claims, 2 Drawing Sheets

STRIP FLATNESS MEASURING DEVICE

TECHNICAL FIELD

The present invention relates generally to shapemeters that measure the flatness of metal strip under tension as the strip passes over a shapemeter roll, and is particularly directed to shapemeters of the type which have a stationary shaft and an outer bearing. The invention is specifically disclosed as a shapemeter in which the stationary shaft is urged against a block having only a single degree of freedom that allows the block to rotate about a pivot point. The shaft has a slot, providing an open area to locate a force transducer that contacts the block, and thereby absorbs some of the vertical load of the block. The horizontal component of the force on the block is entirely supported by the pivot flexural members. The vertical component of this force is partly supported by the pivot flexural members and partly by the force transducer.

BACKGROUND OF THE INVENTION

It is well known in the art that the best and perhaps the only practical way of measuring flatness of strip as it is being rolled by a strip rolling mill, with tension applied to incoming and outgoing strip, is to measure the tension distribution across the width of the strip, as it leaves the rolling mill and travels to a coiler or take-up reel, or some other downstream process.

In general, a strip which has uniform tension distribution would lie flat on a horizontal table if it was subsequently unwound from the coiler and set down with the tension removed. Strip having non-uniform tension distribution would, in general, not lie flat, but would be seen to have wavy or buckled portions, corresponding to the zones of the strip which had been rolled with the lowest tension.

An early shape or flatness measuring device is disclosed in Pearson, U.K. 1,160,112 and corresponding U.S. Pat. No. 3,499,306. The Pearson device of FIG. 1 was not a commercial success, but the Pearson device shown in FIG. 7 of the Pearson '306 patent was. This device and the one shown on FIG. 3 of Pearson '306 operated by sensing the tension distribution in the material, by passing it over a measuring roller.

The measuring roller of Pearson '306 consists of a central, stationary ("dead") shaft, and a series of bearings mounted concentrically on the shaft. These bearings are placed side by side across the full width of the strip material. Transducers are provided at each bearing location to measure the radial force on the bearing, this being a measure of the tension in that portion of the material passing over that bearing. The Pearson device in FIG. 7 utilized fluid film bearings, and pressure transducers were used to measure fluid pressure, which is a measure of radial force. The device in FIG. 3 utilized roller bearings, with a flexible portion on each bearing inner race within the load zone of the bearing. A displacement transducer was used to measure the deflection of this flexible portion, this deflection being a measure of radial force.

Another stationary shaft shapemeter is disclosed in Muhlberg (U.S. Pat. No. 3,557,614), which is similar in concept to the FIG. 3 embodiment of Pearson '306 (but with additional features). The essential features in Muhlberg are a series of bearings mounted upon a common shaft, with suitable covering for the bearings and with a force sensing transducer mounted underneath some or all of these bearings, to measure the radial force developed on these bearings as a result of the strip wrapping around the roll under tension.

Yet another stationary shaft shapemeter is disclosed in Flinth (U.S. Pat. No. 3,413,846). Flinth used a shapemeter roll as a billy roll (which is normally understood in the art to be a roll located between a mill and a coiler, and is used to maintain a constant pass line level through the mill, while the coil diameter is building up (coiling), or reducing (uncoiling). The billy roll consisted of a central, stationary shaft, an outer casing rotatably mounted on the shaft, and a number of pressure sensing means arranged to be influenced by the pressure between the outer casing and the shaft.

The way in which all commercially available shapemeters work is by providing a roll around which the strip passes on its way from the rolling mill to the subsequent process. The strip wraps around the roll usually by an angle in the range 5° to 90°. In some applications this angle can be fixed. In others, for example when the roll is used as the only deflector roll (sometimes called a billy roll) between a rolling mill and a coiler, the wrap angle varies as the coil builds up in diameter as rolling progresses and more strip is added to the coil. However, in all cases a radial force develops on the roll as a result of the strip under tension wrapping around it, and shapemeters work by measuring the distribution of this force across the face of the roll, this being a measure of the distribution of tension across the width of the strip.

In these conventional shapemeters, the distribution of force is measured by a row of transducers mounted within this roll, usually spaced at fixed intervals in the range 20–60 mm across the face of the roll. Because the tension at the strip edges is very critical—since excessive tension at the edges can lead to strip breakage, particularly if the strip edges are cracked or otherwise defective—some shapemeters use smaller intervals or pitches in areas of the roll close to the strip edges than in areas close to the middle of the strip. The portion of the roll corresponding to an individual transducer is known as a measuring zone, and each transducer measures the radial force produced by the portion of strip passing around that zone of the roll.

In principle there are two types of shapemeters covered by the above description. The first type utilizes a single roll mounted in bearings. Transducers are mounted within the roll, which is machined to provide cavities in which the transducers can be fitted. Each measuring zone, and hence each transducer, is covered with a thin ring of steel, which itself may be covered in an elastomeric material. The entire roll consists of a body which is sufficiently long to cover the maximum width of strip to be rolled, and an integral neck at each end of the body. Each neck is bearing mounted within fixed housings. The transducers all rotate with the roll, and therefore, they are only subjected to load for a small portion of each revolution of the roll. If the wrap angle of the strip is 30 degrees, for example, the transducers are loaded for only 30 degrees for each revolution, and are unloaded for the remaining 330 degrees.

In order to obtain electrical signals of load from the transducers (which are rotating), it is necessary to provide slip rings or other devices, such as multi-channel inductive pick-ups or FM radio links, to transfer these signals to a computer or other display device that is positioned at a fixed location. Since there are multiple transducers, their signals are typically sampled and combined into one overall load-relative signal, thereby requiring multiple analog or digital comparators to choose the presently active signal (i.e., the signal of the greatest magnitude).

The second shapemeter type utilizes a fixed (non-rotating) shaft which spans across the width of the strip, and is supported in stationary support blocks. A separate bearing is mounted upon this shaft at each measuring zone, and on the outside of this bearing a plain or urethane covered steel ring is mounted, covering the full width of the zone. On the inside of each bearing a fixed transducer is mounted within the shaft, this transducer measuring the radial force on the bearing. The output signal from each transducer can be directly wired to a stationary external computer or other display device, usually through an axial hole passing through the shaft, provided for this purpose. The transducers are loaded for the full 360° rotation of the roll.

Each of the above types of shapemeters has its advantages. The first type has the advantage that the shaft diameter is effectively the full diameter of the roll, and therefore this has greater rigidity and lower shaft stress and deflection than the second type. The second type has the advantage that no slip rings are required, and that the output signal is steady, and does not need to be sampled. The greater shaft deflection may not be significant when tensions are not too high, wrap angles are not too large, or roll face length is not too long. The deflection can also be reduced by using bearings with a very small section height, such as air film or oil film bearings, or by increasing the roll diameter.

One of the problems associated with any type of shapemeter is the range of force that each transducer may be subject to. Whereas, the total strip tension may typically vary over a range of 20:1, and the total radial force on the shapemeter roll would vary by the same amount, the radial force on each individual zone may easily vary by a factor of four (4) greater than this range, i.e. by as much as 80:1.

This is explained, for example, by considering a typical measuring zone close to the edge of the strip, firstly when rolling at maximum total tension, but producing strip in which the tension on the edges is twice as high as the average tension (and tension at the middle is correspondingly much lower than the average tension). Note that tension here would be expressed as lb/in of strip width (or Kg/mm of strip width) and average tension equals total tension (lb) divided by strip width (in.) (or total tension (Kg) divided by strip width (mm)). In this case the maximum tension in the measuring zone is equal to twice the maximum average tension (i.e., twice the maximum total tension divided by the strip width).

If we now consider, secondly, the same measuring zone, but when producing strip in which the tension at the edges is half as high as the average tension (and tension at the middle is correspondingly higher than the average tension). In this case the minimum tension in the measuring zone is equal to half the minimum average tension (i.e., half the minimum total tension divided by the strip width).

Thus, the range of tension measured in this zone is from two (2)×maximum to one-half (½)×minimum average tension (i.e., it is four (4)×the ratio of maximum total tension to minimum total tension) and thus, if that maximum-to-minimum total tension ratio is 20:1, the range of tension measured in this typical measuring zone would be 80:1.

The difficulty of making measurements of signals having this wide range is that electrical noise can be significant, and may be as high as the minimum signal level. To some extent this noise can be filtered out, at the penalty of reducing the speed of response of the measuring system. It should be noted that the low end of the measuring range is usually the most critical, as it is here that the best performance is desired. This is true because the finished product of the rolling mill is where the strip has been rolled to the lightest gauge, and it is the flatness of the finished product which is of most concern to the rolling mill operator. The flatness produced on earlier passes through the mill can always be corrected by subsequent passes as the material becomes thinner.

One significant problem in conventional shapemeters is that an even greater range of signal levels are normally expected to occur when a shapemeter of the second type (i.e., stationary shaft type) is used in a variable wrap angle situation. If a load cell is used in each measuring zone to measure the radial component of the strip tension force as the strip wraps around the shapemeter roll, then, for a given strip tension force (in that zone) the radial force will vary with wrap angle. In general, for a wrap angle θ, the radial force=2×sin (θ/2)

For a typical rolling mill, θ may vary in the range from 20°–60° or even more. This angle depends upon the diameter of the mandrel upon which the coil is wound, the maximum diameter of the coil, and the vertical and horizontal spacing between shapemeter roll and the coiler mandrel. Thus the radial force for a given tension may have a range as much as 3 to 1. For the above example where the range of signal level would be 80:1 for a fixed angle of wrap, this range of radial force would increase to 240:1, in the case of variable wrap angle.

SUMMARY OF THE INVENTION

Accordingly, it is a primary object of the present invention to provide a stationary shaft shapemeter that measures strip tension in a variable wrap angle location, where the variation in force sensed by the shapemeter's force transducer, as the wrap angle varies, is greatly reduced, so that the total range of force sensed by the transducer is not much greater than the range of force sensed by a fixed wrap angle shapemeter.

It is another object of the present invention to provide a stationary shaft shapemeter that measures strip tension for a given tension and wrap angle, while reducing the force sensed by the transducer, thereby enabling a small and less expensive transducer to be used.

It is a further object of the invention to provide a stationary shaft shapemeter having means for inserting and removing all the load cells for maintenance purposes without requiring disassembly of the unit.

Yet another object of the invention is to provide a stationary shaft shapemeter having flexible spacing means to ensure maximum isolation between each measuring zone and its neighbor.

It is a yet further object of the invention to provide a stationary shaft shapemeter having means for sealing the assembly to prevent ingress of foreign material such as rolling oil or metal chips, and to prevent leakage of the lubricating oil used for the bearings within the assembly.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved shapemeter is provided to measure the flatness of metal strip under tension as the strip passes over a shapemeter roll, the shapemeter including a stationary shaft with a set of bearings that allow the strip to easily pass over the shapemeter roll. The stationary shaft does not touch the inner ring of the bearing, but instead the bearing inner ring is urged against a block having horizontal and vertical flexural members that deflect in only a single degree of freedom. This single degree of freedom allows the block to rotate about a pivot point, which is defined by the locations of the flexural member, in the transverse vertical plane only. The shaft has a slot, which provides an open area within which a box that supports the force transducers is mounted. Each force transducer (e.g., a load cell) is attached to a thrust button that contacts the block, and thereby absorbs some of the vertical load of the block.

The horizontal component of the force on the block is entirely supported by the pivot flexural members. The vertical component of this force is partly supported by the pivot flexural members and partly by the force transducer (through the thrust button). In this manner, the range of force being detected by the force transducer is reduced, thereby allowing for greater low-end sensitivity and accuracy.

The pivot point of the block is held in place by a screw threaded into mating surfaces of the shaft. This pivot point is preferably located above the axis of the bearings and on the coiler side of that axis. The load cell and thrust button combination preferably contact the block on the non-coiler side of that axis. In this configuration, the vertical force P sensed by the load cell is given by the equation:

$$P = \frac{T}{(1+\alpha)} \left[ \sin\theta - \frac{(1-\cos\theta)}{\tan\theta_m} \right], \text{where}$$

T=tension in strip;

θ=wrap angle of strip at shapemeter roll;

X=horizontal distance between bearing axis and pivot point;

Y=vertical distance between bearing axis and pivot point;

Z=horizontal distance between bearing axis and vertical line running though load cell;

α=z/x; and $\theta_m$=arctan (x/y).

The distance z can be zero, but reduced force levels can be achieved by allowing z to be a positive number.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawing and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
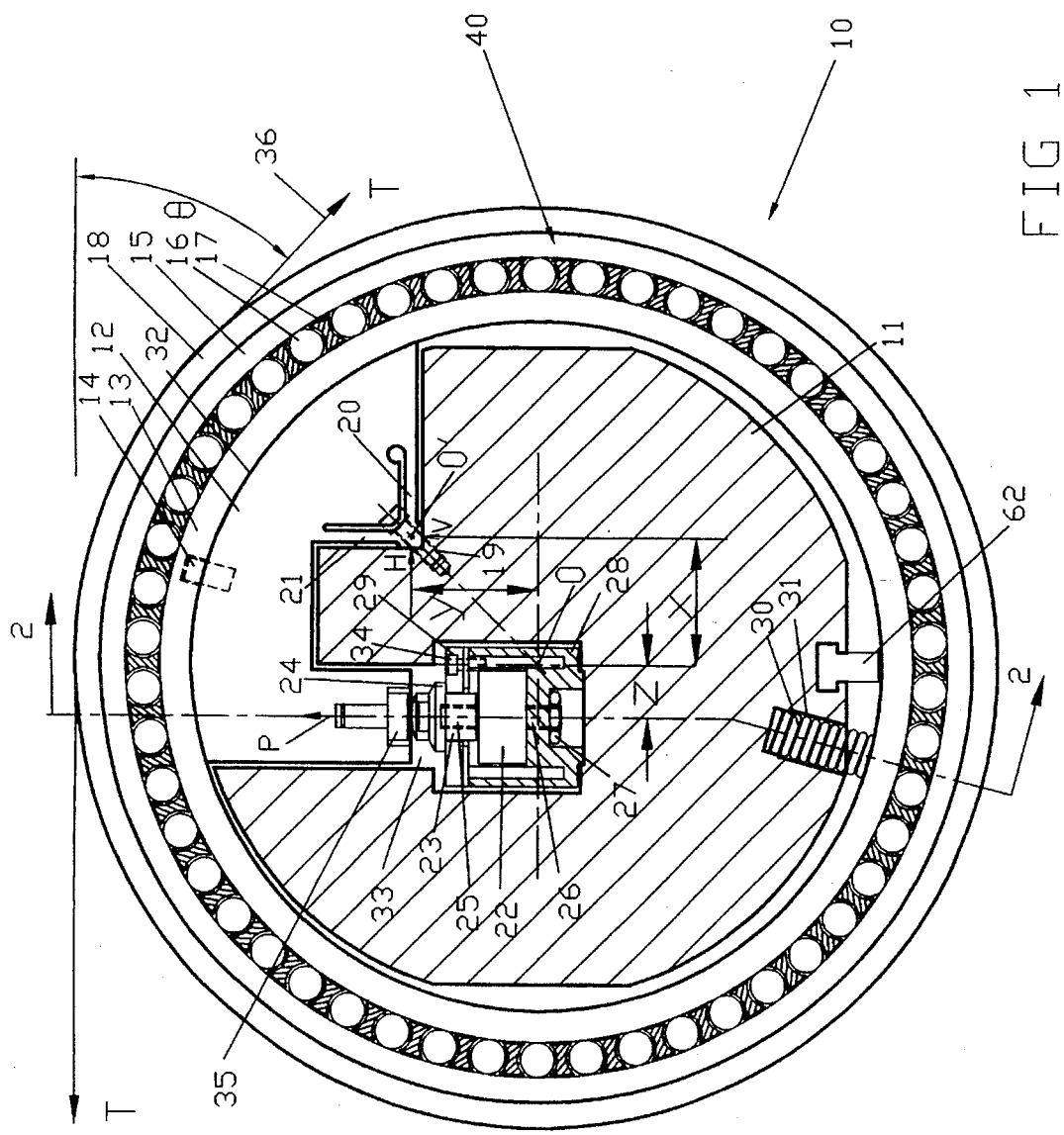
FIG. 1 is a cross-sectional elevation view of one measuring zone of a shapemeter constructed according to the principles of the present invention.
Figure 2:
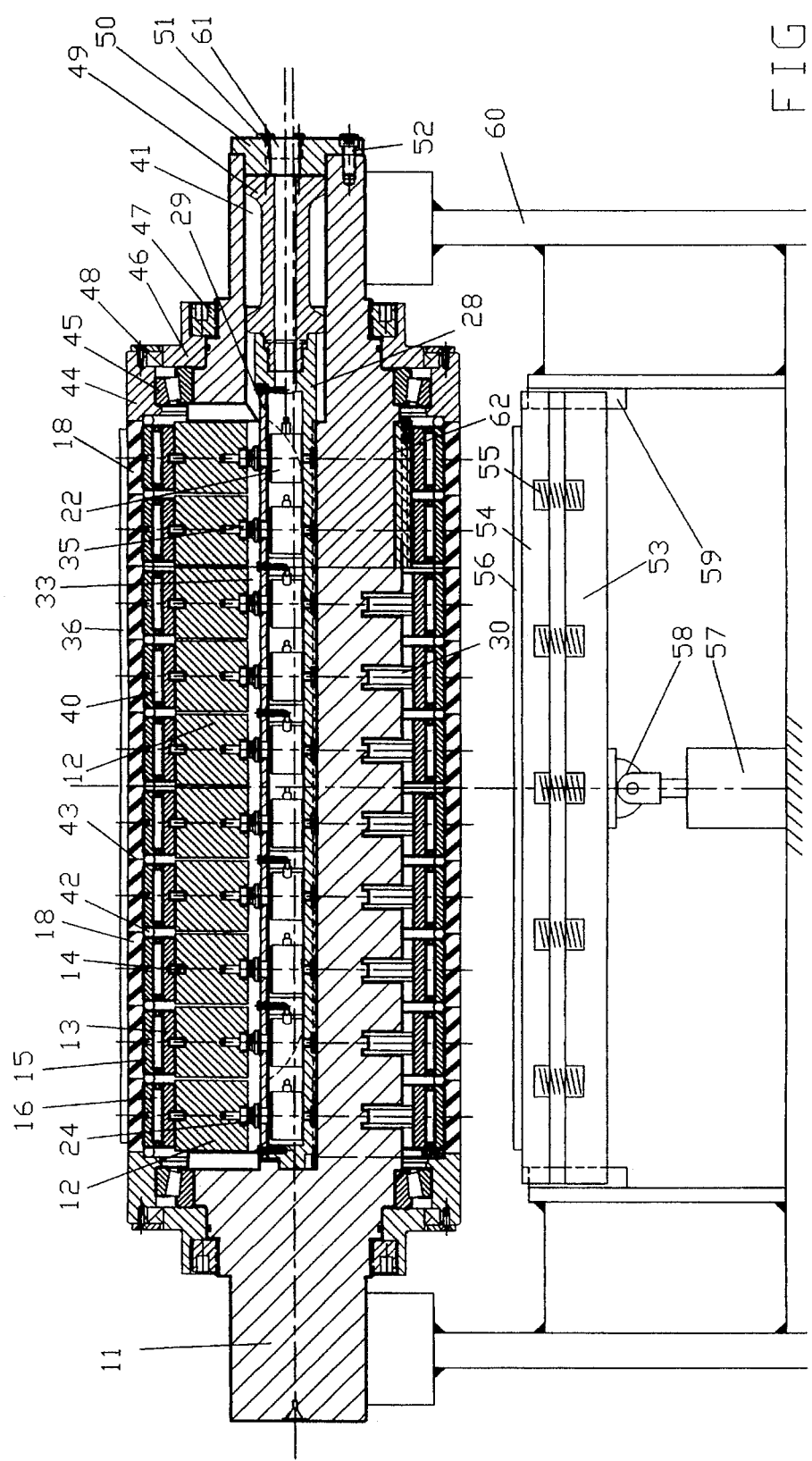
FIG. 2 is a longitudinal section of the shapemeter depicted in FIG. 1, taken along line 2—2.

Referring now to the drawings, FIG. 1 shows an end view, in cross-section, of a shapemeter roll generally designated by the index numeral 10. In FIG. 1 the axis of a shaft 11 is designated by the letter "O." The shaft 11 extends across the full width of the strip, and spans several measuring zones, each of which is identical to the one shown in FIG. 1 and described hereinbelow. Shaft 11 is supported at its ends while in its working position on a support frame 60, as shown in FIG. 2.

For each measuring zone a flex block 12, which includes flexural elements 20 and 21, is mounted to shaft 11 by means of screws 19. A bearing, generally designated by the index numeral 40, consisting of an inner ring 13, rollers or balls 16, cage 17 and outer ring 15, and provided with a cover 18, is mounted as follows: Bearing inner ring 13 is mounted on flex block 12, and pinned by pin 14 to prevent rotation of inner ring 13. Inner ring 13 is preloaded by spring 30, mounted in pocket 31 in shaft 11, to ensure firm contact between inner ring 13 and flex block 12. The outer surface 32 of flex block 12 is machined as a radius having its center at O, so that bearing inner ring 13 has its axis at zero (and does not rotate), and so cage 17, outer ring 15, and cover 18 all rotate around center O. Bearing rollers or balls 16 also follow a circular path which has its center at O. Hardened steel rest buttons 35 are provided in the bottom of each flex block.

A strip 36 passes over shapemeter roll 10 on its path from a rolling mill or other process to a coiler (in either direction) and contacts outer cover 18 of each measuring zone as shown. This outer cover could be of hardened steel or urethane or other suitable material which will not wear too quickly, and will not mark the strip 36. Normally strip 36 follows a fixed horizontal path at one side of the shapemeter (the process side) and a variable sloping path at the other side of the shapemeter (the coiler side), with the slope of the strip (equal to the tangent of the wrap angle of the strip around the roll) varying with the diameter of the coil as it varies during coiling or uncoiling. In FIG. 1 the process side is at the left and the coiler side at the right. For the case where the process side is on the right and coiler side is on the left, the equipment arrangement would simply be a mirror image of the arrangement of FIG. 1.

A slot 33 is provided within shaft 11, said slot covering the full width of the strip 36. Within slot 33, a box 28 is located, having a cover 29 held on by a set of screws 34. Within this box, a set of load cells 22 are mounted, one for each measuring zone. These are commercial strain gauge load cells of the type made by such companies as Revere Inc., & Interface Inc., which incorporate mounting screws 25 at the top and 26 at the bottom. Each load cell 22 is mounted in box 28 using a nut 27 to hold the cell down, and each load cell 22 supports one of the flex blocks 12 using a thrust button 23 which is screw mounted to the top of the load cell by means of screw 25. The thrust button passes through a hole in cover 29, sealed with seal 24, and contacts rest button 35 in flex block 12.

It should be noted that bearing inner ring 13 is supported entirely by flex block 12, against which it is preloaded by spring 30. At no point does the bearing inner ring 13 contact shaft 11. Thus, all the radial force which develops upon bearing 40 due to strip 36 being under tension and passing around bearing cover 18 is applied directly to flex block 12. Flex block 12 transfers the radial force to shaft 11 as follows: the horizontal force component is transferred via flex element 20 (in compression), and the vertical force component is transferred partially via flex element 21 (in compression) and partially via the combination of rest button 35, thrust button 23, load cell 22 and box 28.

Because flex elements 20 and 21 are relatively long and thin, their flexural stiffness is low relative to their axial stiffness. Point O', which lies at the intersection of the neutral axes of flex elements 20 and 21, becomes an effective pivot point, about which flex block 12 is free to rotate. In fact it is only the support by the load cell which prevents such rotation. It is possible to calculate the force P arising on the load cell, for a given tension T and wrap angle $\theta$, as follows:

Resolving horizontally, $H=T(1-\cos\theta)$ (Equation 1);

Resolving vertically, $P+V=T\sin\theta$ (Equation 2);

Taking Moments about $O$, $Vx-Pz=Hy$ (Equation 3);

where x, y and z are dimensions given on FIG. 1, and where

P=vertical support force provided by load cell 22;

V=vertical support force provided at pivot (point O');

H=horizontal support force provided at pivot (point O');

If $\theta_m$ is defined: $\theta_m=\arctan(x/y)$ (Equation 4);

and $\alpha$ is defined: $\alpha=(z/x)$ (Equation 5);

The following expression can be derived:

$$P=\frac{T}{(1+\alpha)}\left[\sin\theta-\frac{(1-\cos\theta)}{\tan\theta_m}\right].$$ (Equation 6)

As an example, consider the case where $\theta_m=40°$ and $\alpha=0$ (i.e. z=0), and compare values of P with values of radial force (2 T sin ($\theta$/2)), and vertical component of force (T sin $\theta$) with P at various values of wrap angle $\theta$, as shown in the Table below:

| θ | 20 | 25 | 30 | 35 | 40 | 45 | 50 | 55 | 60 | NOTE |
|---|---|---|---|---|---|---|---|---|---|---|
| (RADIAL FORCE)/T | 0.347 | 0.432 | 0.518 | 0.601 | 0.684 | 0.765 | 0.845 | 0.923 | 1.00 | 2sin(θ/2) |
| (VERTICAL COMPONENT)/T | 0.342 | 0.423 | 0.500 | 0.573 | 0.643 | 0.707 | .0766 | 0.819 | 0.866 | sin θ |
| P/T | 0.270 | 0.311 | 0.340 | 0.358 | 0.363 | 0.358 | 0.340 | 0.311 | 0.270 | |

It can be seen from the above Table that values for P/T only vary within the range 0.270 to 0.363 which gives an operating ratio in the range of approximately 1:1.34 as the wrap angle $\theta$ varies from 20° to 60°. At the same time, the (radial force)/T values vary from 0.347 to 1.00 (an operating ratio range of 1:2.88) and the (vertical component)/T values vary from 0.342 to 0.866 (an operating ratio range of 1:2.53).

Thus, by using the pivoting flex block structure as described above, the present invention is able to reduce the variation in signal level by a factor of about two (2) relative to the variation in signal level that would have resulted from measuring the radial force or the vertical component directly.

A further advantage of the flex block structure of the present invention is that the maximum force P on the load cell is only 0.363×the tension T (and occurs at a wrap angle of 40° in this example). By comparison, the maximum radial force is 1.00×T and the maximum vertical component is 0.866×T, both of these maxima occurring at a wrap angle of 40°. In fact, it is possible to reduce the maximum value of P even further, by moving the load cell 22 to the left in FIG. 1, (i.e., by increasing the value of $\alpha$). For example, if z is set to 0.25x, then $\alpha=z/x=0.25$, and the value of P is reduced by a factor of 1:1.25, i.e., by 20%.

It can also be observed in the above Table that, if $\theta_m$ is set to a value mid-way between the minimum and maximum wrap angles, then, for a given range of wrap angle, the variation in P/T is minimized. Thus if $\theta$min =20°, $\theta$max= 50°, and $\theta_m=40°$, then the value of P/T ranges from 0.270 to 0.363; i.e., for a wrap angle range $\theta$max–$\theta$min of 30°, the operating ratio range of P/T varies by 1:1.34.

However, if $\theta$min=25°, $\theta$max=55° and $\theta_m=40°$, (which is equal to ($\theta$min+$\theta$max)/2), the value of P/T ranges from 0.311 to 0.363, and for the same 30° range, the operating ratio range of P/T only varies by 1:1.17.

Although it has been demonstrated to be desirable to select values of x and y which define the location of the pivot center O' of flex block 12, in order to achieve a value of $\theta_m$ mid-way between minimum and maximum wrap angles $\theta$, it may not be possible to achieve this ideal. Provided that $\theta_m$ is set as close to this value as possible, however, the range of variation of signal P/T as the wrap angle $\theta$ varies will be minimized. The important factors are (a) that the pivot center O' should be located above, and on the coiler side, relative to the axis of the shaft 11 and bearings, (b) that it should be located so that the resultant of the strip tension force always passes above the pivot center, so that force P is always positive and the load cell is in compression at all times (and so the second term in Equation (6) is always smaller than the first term), and (c) $\theta_m$ should be set as close as possible to a value mid-way between minimum and maximum wrap angles $\theta$.

FIG. 2 shows a longitudinal section of the shapemeter roll showing how the various measuring zones (ten zones in this example) are arranged along shaft 11. Shaft 11 is mounted at its ends upon a support frame 60. Bearing outer rings 15 are spaced apart from each other by O-rings 42 and are retained in position at each end by rotating spacer rings 44, each of which is spaced from the adjacent outer ring 15 by one of the O-rings 42. The rotating spacer rings 44 are bearing mounted on shaft 11 using a thrust bearing 45 and stationary spacer rings 46, which are mounted on said shaft at each end, and are tightened against the respective adjacent thrust bearings using nuts 47 screwed on shaft 11 in order to provide axial preload of all the outer rings.

It should be noted that the widths of covers 18 are made so that when the desired preload is achieved on the outer rings, O-rings 42 will have compressed sufficiently to obtain the desired axial force, while still maintaining a gap 43 between each cover 18 and its neighbor, and between end covers 18 and rotating spacer rings 44. The parts are made with high precision so that gaps 43 are all in the range 0.002" (0.05 mm) to 0.005" (0.13 mm), thus minimizing the chance of marking strip 36 as it passes over the roll. The O-rings 42 thus form resilient spacing means and also seal against ingress of contaminants and leakage of bearing lubricating oil.

O-rings 42 also have a further function. One of the concerns with a shapemeter of this type is that each measuring zone should be isolated, so that only a minimum (hopefully negligible) radial load should be transferred from one measuring zone to the adjacent measuring zones, which tend to cause errors in the load cell readings. If a radial load is applied to one zone only (for example, using a strip 36 equal or narrower in width compared to that one zone), it is important that a loading force is transmitted directly to the load cell of the particular zone only, and not to the load cells of the adjacent zone or zones. Some load transfer, practically speaking, is inevitable since each load cell will deflect approximately 0.002" (0.05 mm) under full load, and the resultant shear of the adjacent O-rings 42 is bound to transfer some part of that load to the adjacent load cells 22. By making the parts with high precision and using a soft material and special cross section for the O-rings it has been demonstrated that the load transfer can be reduced to about 1% or 2%, this value being consistent for all the measuring zones. The effect of this load transfer can also be compensated for in the computer software used to drive the display. Thus the O-rings 42 are able to separate the covers 18, seal the gaps between outer rings 15, and also provide resilient spacing means which are sufficiently weak in shear to minimize radial load transfer from one measuring zone to the next.

It should also be recognized that since the shapemeter roll is driven (i.e. rotated) by the strip 36 passing around it, and the strip width could be as small as half the width shown in FIG. 2, then the O-rings 42 must be able to transfer sufficient torque to drive all the outer rings not contacted by the strip, and also to drive rotating spacer rings 44 and bearings 45, while overcoming any drag of seal 48 without slippage. This is the reason that axial preloading of the bearing outer rings 15 is required. Although the use of O-rings, i.e. elastomeric rings having a circular cross section, is described in the illustrated embodiment, it will be understood that it is possible for use square section, x-section, or other special sections, provided that the rings are made to a sufficiently pliable resilient material that will also provide a good seal.

The load cells 22 are preferably all mounted in one box 28 which is made suitably long to fit within slot 33 (see FIG. 1) of shaft 11. A hole 41 is provided in one end of shaft 11 through which box 28 can be inserted and withdrawn. A spacer tube 49 is used to locate the box axially and is screwed into the box at one end, and attached to a mounting flange 50 at the other end by screws 51. Flange 50 is attached to shaft 11 by screws 52 to locate the assembly within the shaft. The electrical power supply and signal cables (not shown) to the load cells pass through spacer tube 49 and flange 50. A female thread 61 is provided in flange 50, enabling electrical conduit to be attached to said flange. The load cell electrical cables (not shown) are connected at the other end of the conduit, to suitable electrical and/or computer equipment for amplification and display of the load signals.

In order to install or remove the box 28 containing the load cells 22, it is necessary to remove the radial preload forces provided by springs 30, which preload each flex block 12 against its respective load cell. This is done by urging the outer rings 15 of all the bearings 40 so that said bearings are pressed up against springs 30, thus relieving said radial preload forces. It is necessary to ensure that all bearings 40 are lifted so that all of the radial preloads (one for each measuring zone) are relieved.

A hydraulic cylinder 57, mounted on frame 60 is used to apply the lifting force which urges bearings 40 upwards. A stiff beam 53, (clevis) mounted to cylinder 57 by clevis 58 and guided at its end by guides 59 mounted in frame 60, is used to spread the load across the roll. To overcome the effects of deflection of beam 53, a set of springs 55 connect beam 53 to an upper beam 54, also guided at its ends by guides 19, so that the upward force on the upper beam 54 is substantially equally divided between the springs, thereby minimizing non-uniform deflection of said upper beam 54. Finally, a covering 56 of soft elastomeric material such as polyurethane, bonded to the top of beam 54, ensures even more uniform load distribution, and avoids damage to covers 18 when the lifting force is applied. A key 62 is used to ensure that bearings are not lifted so far that pins 14 will disengage from inner rings 13. During normal operation of the shapemeter 10, hydraulic cylinder 57 is retracted ensuring that covering 56 is well clear of covers 18.

In order to remove box 28 containing all the load cells, the process is stopped and strip 36 is removed. Cylinder 57 is extended with sufficient pressure to lift bearings 40 until they abut key 62. Screws 52, which attach flange 50 to shaft 11, are then removed. The entire assembly consisting of box 28, load cells 22, spacer tube 49 and flange 50, etc., can be slid out of the shaft 11 through hole 41. If a spare assembly is available, it can be slid into position and screws 52 inserted. Cylinder 57 can be retracted and the shapemeter 10 can be placed into operation immediately.

If a spare assembly is not available, then a "dummy" assembly made from a solid steel bar having the identical mounting dimensions to the assembly of the box, load cells, spacer tube and flange can be slid into position and screws 52 inserted. Cylinder 57 can then be retracted and the rolling mill, or other process, can be restarted, but without any display from the shapemeter. This enables the process to maintain production while load cells are being serviced. As soon as this servicing is done, the "dummy" assembly can be removed and the original assembly of the box, load cells, spacer tube and flange can be slid into position using the same procedure.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. In a shapemeter roll used for measuring flatness of metal strip under tension by measuring distribution of tension across the width of the strip as it passes over said shapemeter roll, said metal strip defining a varying wrap angle on said shapemeter roll, the invention being a shapemeter comprising a set of bearings mounted upon a stationary shaft having a block mounted within each of said bearings between each of said bearings and said shaft, wherein said wrap angle of the metal strip, as it passes over said set of bearings, varies due to the coiling or uncoiling of a coiler located at one of an upstream and downstream position with respect to said shapemeter, a force transducer being mounted between said block and said shaft and used to sense a portion of the force on said block arising as a result of the radial force on at least one of said bearings applied by said metal strip under tension as it passes over said at least one bearing, and a flexure pivot support in said block which anchors said block on said shaft in horizontal and vertical directions, but provides a single degree of freedom thereby enabling rotation of said block in a vertical plane transverse to said shaft about said flexure pivot support, the horizontal component of said force on said block being supported by said flexure pivot support, and the vertical component of said force on said block being partly supported by said flexure pivot support and partly supported by said force transducer, and wherein variations in force applied to said force transducer are minimized as said wrap angle varies.

2. A shapemeter as recited in claim 1, wherein the pivot point of said pivot support is located above the axis of said bearings and said shaft, and is located on the coiler side of said axis.

3. A shapemeter as recited in claim 2, wherein said pivot point is located a vertical distance y above said axis and a horizontal distance x to the side of said axis, and wherein the ratio of x to y is such that the tangent of the mean wrap angle of the metal strip is substantially equal to the ratio x:y.

4. A shapemeter as recited in claim 3, wherein the vertical force P against said force transducer is determined by the following equation:

$$P = \frac{T}{(1+\alpha)} \left[ \sin\theta - \frac{(1-\cos\theta)}{\tan\theta m} \right],$$

wherein:
T=tension in said metal strip;
θ=wrap angle of said metal strip at said shapemeter roll;
z=horizontal distance between said axis and a vertical line running through said force transducer;
α=z/x; and
θm=arctan (x/y).

5. A shapemeter as recited in claim 1, wherein the pivot point of said pivot support is located above the axis of said bearings and said shaft, and is located on the coiler side of said axis.

6. A shapemeter as recited in claim 5, wherein said pivot point is located a vertical distance y above said axis and a horizontal distance x to the side of said axis, and wherein the ratio of x to y is such that the tangent of the mean wrap angle of the metal strip is substantially equal to the ratio x:y.

7. A shapemeter as recited in claim 1, further comprising a spring which urges said shaft and said block together during normal operation.

8. A shapemeter as recited in claim 1, wherein said shaft includes an open slot, thereby providing a suitable area for locating said force transducer, said force transducer receiving said partial vertical component of said force on said block via a thrust button positioned between said block and said force transducer.

9. A shapemeter as recited in claim 1, wherein said force transducer comprises a load cell.

10. A shapemeter as recited in claim 1, wherein said pivot support comprises a vertical surface of said shaft and a horizontal surface of said shaft, both said surfaces abutting vertical and horizontal surfaces of said block proximal to said vertical and horizontal flexural members.

11. In a shapemeter roll used for measuring flatness of metal strip under tension by measuring distribution of tension across the width of the strip as it passes over said shapemeter roll, said metal strip defining a wrap angle on said shapemeter roll as the metal strip passes over said shapemeter roll, the invention being a shapemeter comprising a set of bearings mounted upon a common stationary shaft having a block mounted within each of said bearings between each of said bearings and said shaft, a force transducer being mounted between said block and said shaft and used to sense a portion of the force on said block arising as a result of the radial force on at least one of said bearings applied by said metal strip under tension as it passes over said at least one bearing, and a flexure pivot support in said block which anchors said block on said shaft in horizontal and vertical directions, but provides a single degree of freedom thereby enabling rotation of said block in a vertical plane transverse to said shaft about said flexure pivot support, the horizontal component of said force on said block being supported by said flexure pivot support, and the vertical component of said force on said block being partly supported by said flexure pivot support and partly supported by said force transducer, and wherein variations in force applied to said force transducer are minimized as said wrap angle varies.

12. In a shapemeter roll used for measuring flatness of metal strip under tension by measuring distribution of tension across the width of the strip as it passes over said shapemeter roll, the invention being a shapemeter comprising a set of bearings mounted upon a stationary shaft having a force transducer mounted inside each of said bearings to measure a portion of the radial force on each of said bearings, and a single box within which all of said force transducers are mounted, said box being configured so that all of said transducers are installed and removed within said box without disassembling said shapemeter roll, and wherein variations in force applied to said force transducers are minimized as said wrap angle varies.

13. In a shapemeter roll used for measuring flatness of metal strip under tension by measuring distribution of tension across the width of the strip as it passes over said shapemeter roll, the invention being a shapemeter comprising a set of bearings mounted upon a stationary shaft having a force transducer mounted inside each of said bearings to measure a portion of the radial force on each of said bearings, and axially preloaded resilient spacing/sealing means placed between the outer rings of each pair of said bearings for providing drive torque to those of said bearings not covered by said strip, and for sealing the bearings and providing isolation of measuring zones detected by said force transducers so that minimum radial force is transferred from one of said measuring zones to the next, and wherein variations in force applied to said force transducers are minimized as said wrap angle varies.

14. A shapemeter as recited in claim 13 wherein said spacing/sealing means comprise elastomeric O-rings of the type exhibiting one of a circular and non-circular cross section.

15. In a shapemeter roll used for measuring flatness of metal strip under tension by measuring distribution of tension across the width of the strip as it passes over said shapemeter roll, said metal strip defining a varying wrap angle on said shapemeter roll, the invention being a shapemeter comprising a set of bearings mounted upon a stationary shaft having a block mounted within each of said bearings between each of said bearings and said shaft, wherein said wrap angle of the metal strip, as it passes over said set of bearings, varies due to the coiling or uncoiling of a coiler located at one of an upstream and downstream position with respect to said shapemeter, a force transducer being mounted between said block and said shaft and used to sense a portion of the force on said block arising as a result of the radial force on at least one of said bearings applied by said metal strip under tension as it passes over said at least one bearing, and a pivot support in said block which anchors said block on said shaft in horizontal and vertical directions, but provides a single degree of freedom thereby enabling rotation of said block in a vertical plane transverse to said shaft about said pivot support, the horizontal component of said force on said block being supported by said pivot support, and the vertical component of said force on said block being partly supported by said pivot support and partly supported by said force transducer, and wherein the pivot point of said pivot support is located above the axis of said bearings and said shaft, and is located on the coiler side of said axis, and wherein said pivot point is located a vertical distance y above said axis and a horizontal distance x to the side of said axis, and wherein the ratio of x to y is such that the tangent of the mean wrap angle of the metal strip is substantially equal to the ratio x:y.

16. A shapemeter as recited in claim 15, wherein the vertical force P against said force transducer is determined by the following equation:

$$P = \frac{T}{(1+\alpha)} \left[ \sin\theta - \frac{(1-\cos\theta)}{\tan\theta m} \right],$$

wherein:

T=tension in said metal strip;

θ=wrap angle of said metal strip at said shapemeter roll;

z=horizontal distance between said axis and a vertical line running through said force transducer;

α=z/x; and

θm=arctan (x/y).

17. In a shapemeter roll used for measuring flatness of metal strip under tension by measuring distribution of tension across the width of the strip as it passes over said shapemeter roll, said metal strip defining a varying wrap angle on said shapemeter roll, the invention being a shapemeter comprising a set of bearings mounted upon a stationary shaft having a block mounted within each of said bearings between each of said bearings and said shaft, wherein said wrap angle of the metal strip, as it passes over said set of bearings, varies due to the coiling or uncoiling of a coiler located at one of an upstream and downstream position with respect to said shapemeter, a force transducer being mounted between said block and said shaft and used to sense a portion of the force on said block arising as a result of the radial force on at least one of said bearings applied by said metal strip under tension as it passes over said at least one bearing, and a pivot support in said block which anchors said block on said shaft in horizontal and vertical directions, but provides a single degree of freedom thereby enabling rotation of said block in a vertical plane transverse to said shaft about said pivot support, the horizontal component of said force on said block being supported by said pivot support, and the vertical component of said force on said block being partly supported by said pivot support and partly supported by said force transducer and wherein said pivot support comprises a flexure pivot support further comprising machined slots in said block, thereby creating vertical and horizontal flexural members as integral parts of the block, and wherein the pivot point of said pivot support is located above the axis of said bearings and said shaft, and is located on the coiler side of said axis, and wherein said pivot point is located a vertical distance y above said axis and a horizontal distance x to the side of said axis, and wherein the ratio of x to y is such that the tangent of the mean wrap angle of the metal strip is substantially equal to the ratio x:y.

18. In a shapemeter roll used for measuring flatness of metal strip under tension by measuring distribution of tension across the width of the strip as it passes over said shapemeter roll, said metal strip defining a varying wrap angle on said shapemeter roll, the invention being a shapemeter comprising a set of bearings mounted upon a stationary shaft having a block mounted within each of said bearings between each of said bearings and said shaft, wherein said wrap angle of the metal strip, as it passes over said set of bearings, varies due to the coiling or uncoiling of a coiler located at one of an upstream and downstream position with respect to said shapemeter, a force transducer being mounted between said block and said shaft and used to sense a portion of the force on said block arising as a result of the radial force on at least one of said bearings applied by said metal strip under tension as it passes over said at least one bearing, and a pivot support in said block which anchors said block on said shaft in horizontal and vertical directions, but provides a single degree of freedom thereby enabling rotation of said block in a vertical plane transverse to said shaft about said pivot support, the horizontal component of said force on said block being supported by said pivot support, and the vertical component of said force on said block being partly supported by said pivot support and partly supported by said force transducer and wherein said pivot support comprises a flexure pivot support further comprising machined slots in said block, thereby creating vertical and horizontal flexural members as integral parts of the block, and wherein the pivot point of said pivot support is located above the axis of said bearings and said shaft, and is located on the coiler side of said axis, and wherein said pivot support comprises a vertical surface of said shaft and a horizontal surface of said shaft, both said surfaces abutting vertical and horizontal surfaces of said block proximal to said vertical and horizontal flexural members.

* * * * *